Patented Feb. 9, 1926.

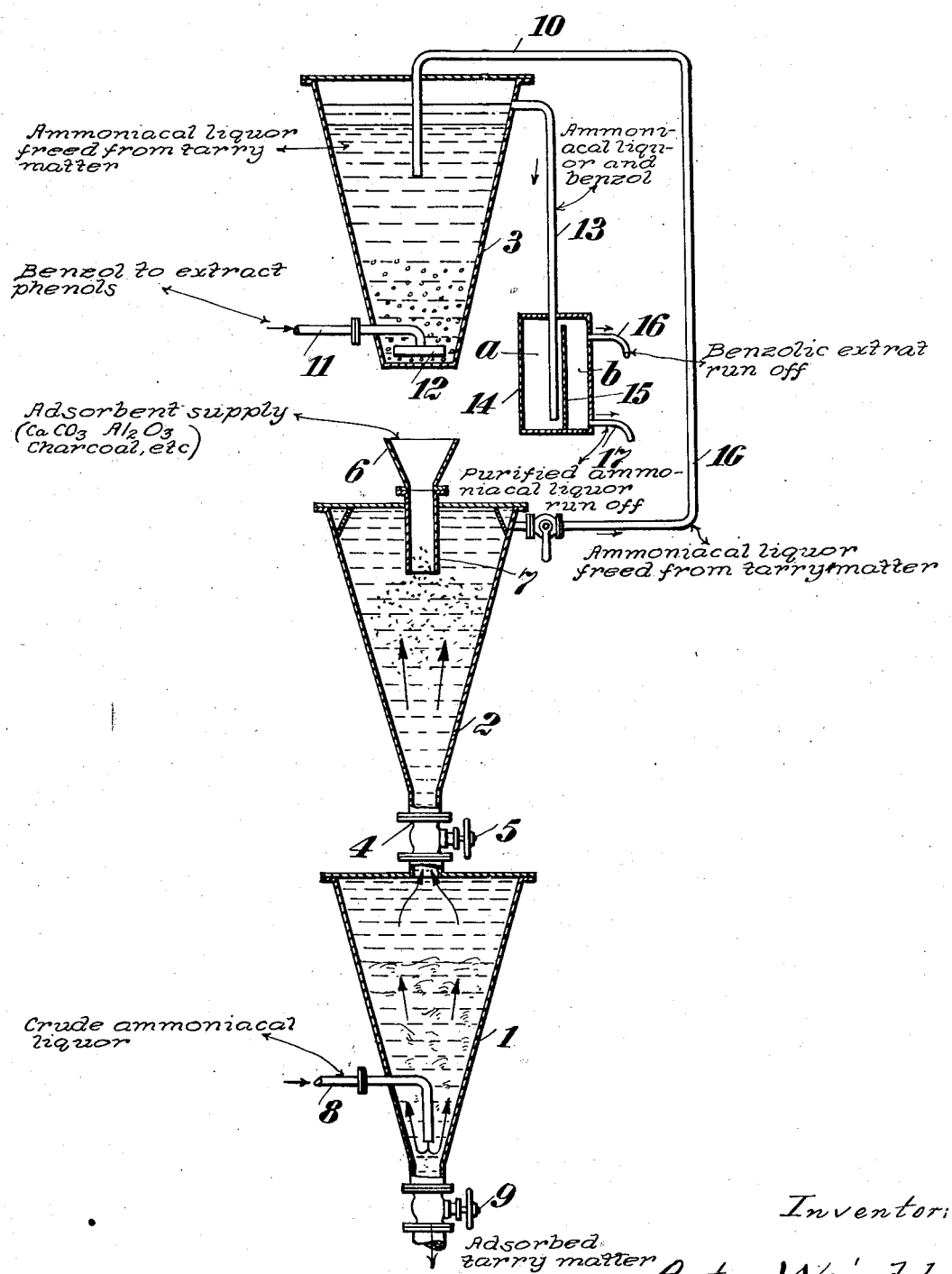

1,571,986

UNITED STATES PATENT OFFICE.

ANTON WEINDEL, OF ESSEN-RUHR, GERMANY, ASSIGNOR TO ZECHE MATHIAS STINNES, OF ESSEN-RUHR, GERMANY.

PROCESS FOR THE PURIFICATION OF CRUDE AMMONIACAL LIQUORS.

Application filed July 23, 1924. Serial No. 727,747.

*To all whom it may concern:*

Be it known that I, ANTON WEINDEL, a citizen of the German Republic, residing at Essen-Ruhr, Germany, have invented new and useful Improvements in a Process for the Purification of Crude Ammoniacal Liquors, of which the following is a specification.

Crude ammoniacal liquors produced as a by-product from the dry distillation of coal contain finely divided particles of coal tar in suspension and organic substances such as phenols, pyridine and the like in aqueous solution. It has been proposed to purify those liquors by extraction with benzol and the like before driving off the ammonia gas with calcium hydroxide in a manner well known. By that process both the particles of tar and the organic substances are dissolved and can be easily separated from the ammoniacal liquors. However, there is the drawback of the organic solvent soon becoming very dirty, so that it must be purified before being used over again. Besides, the organic substances thus recovered, are also adulterated by tar and in order to recover them in a pure state, they must be treated with sodium hydrate and an acid, which makes the process rather expensive.

For that reason it has been suggested to purify the ammoniacal liquors by means of suitable adsorbents, which are able to absorb the tar and the phenols and the like. The adsorbents being in a solid state can be easily removed from the liquors by clarifying or filtration. That process has the disadvantage that the mass consisting of the adsorbents, tar and phenols has a greasy appearance and it is very difficult to recover the phenols in a pure state. Besides, the recovery of the adsorbents for re-use also presents great difficulties.

The object of the present process is to overcome those difficulties by a two-stage process. In the first stage the crude ammoniacal liquor is treated with such adsorbents as calcium carbonate, alumina, sawdust, wood-charcoal and the like which fix and bind the finely divided and suspended particles of tar. The dirty mass thus produced is separated in the usual manner and the clarified ammoniacal water is now in the second stage of the process extracted with benzol, preferably at an elevated temperature, whereby the phenols are quickly dissolved. The two liquors comprised in the mixture are allowed to separate according to their different specific gravities and from the benzolic extract the phenols are obtained in a pure state by distilling off the solvent, while at the same time the benzol is not adulterated by tar and can be reused for another operation without purification.

In practice the process is carried out either intermittently or continuously. When practising intermittently, any adsorbents substance is added to the crude ammoniacal liquor and the mass is vigorously stirred for some time. It is then allowed to settle and after filtering some benzol is added to the clarified liquor, the amount of benzol depending on the quantity of phenol dissolved. After vigorously agitating for some time the mixture of the liquors is allowed to subside, the upper benzolic layer is then decanted and distilled. The residue obtained consists of the phenols in the pure state. The ammoniacal liquor forming the bottom layer is treated in a manner well known for the recovery of ammonia.

Preferably the process is carried out continuously. The single figure of the accompanying drawing is a diagrammatic vertical cross-section of an apparatus designed for practising the process.

The apparatus consists of three conical containers, 1, 2 and 3, placed one on the top of another and directed with their apices downwards. By a conduit 4 with closing valve 5 containers 1 and 2 stand in connection with each other. The adsorbent is fed into the container 2 by means of a funnel 6 having a prolongation 7. The crude ammoniacal liquor to be purified enters the bottom of container 1 by way of a pipe 8 bent at a right angle downwards. It continually flows upwards and meets in a countercurrent the adsorbent fed into the container 2, where a portion gradually sinks downwards into the container 1. The rate of flow of the liquor is regulated in such a manner that the greater portion of the adsorbent is kept in suspension at about the middle of the container 2, where it adsorbs the tarry matter which gradually sinks down as a greasy mass into the bottom of container 1, where it is run off from time to time by opening the bottom valve 9.

The ammoniacal liquor thus freed from the tarry matter is then driven from container 2 by the conduit 10 into about the middle of the top container 3. At the same time benzol in a finely divided state is allowed to rise in the shape of pearly drops by means of a pipe 11 with rose 12 from the bottom upwards in the container 3, where it extracts the phenols dissolved in the aqueous liquor. The mixture of liquor and benzol is continually withdrawn by a pipe 13 and run into the bottom of a tall tank 14 provided with a division wall 15, so that the aqueous liquor can overflow from the compartment $a$ into compartment $b$, in which latter compartment the separation of the benzolic top layer from the aqueous bottom layer is effected. The benzolic extract is run off by the pipe 16 into a collecting tank and thence to a distilling appartus (not shown) to recover the benzol for re-use and the phenols, whereas the purified ammoniacal liquor is carried away by pipe 17 and treated for the production of ammonia in a manner well known.

The ammoniacal liquor before entering the top container 3 should preferably be warmed in any convenient manner up to 40 or 45° C., so that the particles of benzol may ascend through the warm liquor, whereby a great saving of time and benzol is effected.

The waste water from the ammonia stills can then be run into the river and being free from tar, phenols and the like can do no harm to the fishing industry.

What I claim is:

1. A process for the purification of crude ammoniacal liquor, consisting in subjecting the liquor to a two-stage treatment comprising the steps of initially allowing a solid adsorbent to act for some time to adsorb the finely divided particles of tar and, after removing the adsorbed mass, of extracting the pre-purified liquor with a solvent for recovering the phenols in solution.

2. A process for the purification of crude ammoniacal liquor, consisting in subjecting the liquor to a two-stage treatment comprising the steps of initially allowing a solid adsorbent to act for some time to adsorb the finely divided particles of tar and, after removing the adsorbed mass, of extracting the pre-purified liquor with a solvent for recovering the phenols in solution, the extraction being carried out at an elevated temperature.

3. A process for the purification of crude ammoniacal liquor, comprising the steps of subjecting the liquor to the action of a solid adsorbent to cause the latter to adsorb the finely divided particles of tar; drawing off the liquor thus freed from the tar particles and subjecting it to the action of benzol to extract the phenols contained in solution therein; drawing off the mixture of liquor and benzol into a tank; and separately drawing off the benzolic extract and the purified ammoniacal liquor from said tank.

In testimony whereof I have signed my name to this specification.

ANTON WEINDEL.